J. A. BENTZ.
TRACTION LUG.
APPLICATION FILED APR. 27, 1921.
1,436,229.
Patented Nov. 21, 1922.
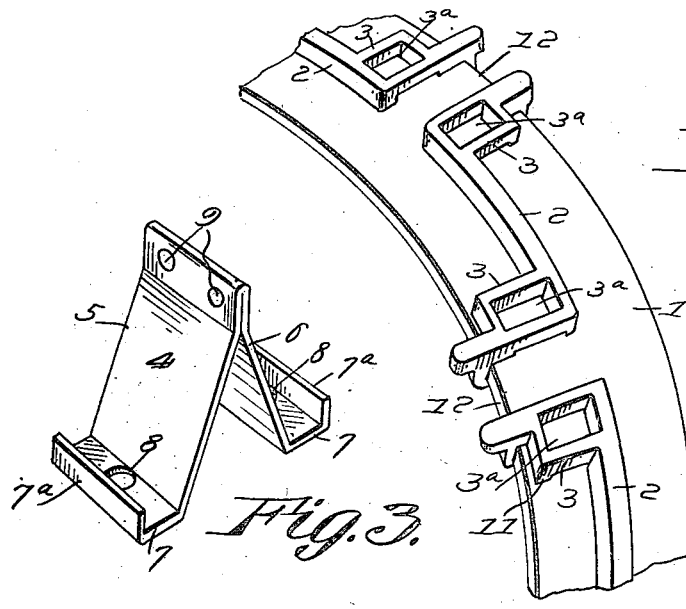
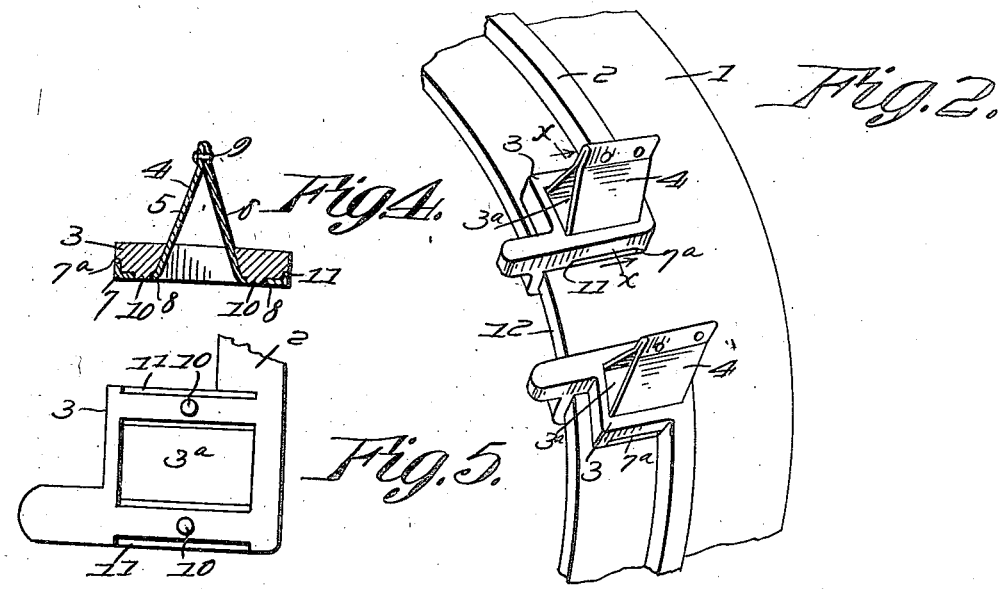
Inventor
John A. Bentz,
By George A. Prevost
Attorney Patented Nov. 21, 1922.

1,436,229

UNITED STATES PATENT OFFICE.

JOHN A. BENTZ, OF HARRISBURG, PENNSYLVANIA, ASSIGNOR OF ONE-HALF TO WALTER S. SCHELL AND ONE-HALF TO BESSIE M. BENTZ, BOTH OF HARRISBURG, PENNSYLVANIA.

TRACTION LUG.

Application filed April 27, 1921. Serial No. 464,946.

*To all whom it may concern:*

Be it known that I, JOHN A. BENTZ, a citizen of the United States, residing at Harrisburg, in the county of Dauphin and State of Pennsylvania, have invented certain new and useful Improvements in Traction Lugs; and I do hereby declare the following to be a full, clear, and exact description of the invention, such as will enable others skilled in the art to which it appertains to make and use the same.

My invention relates to wheels for tractors and similar machines in the use of which it is desirable to increase the traction in some instances and decrease it in others.

In my U. S. Letters Patent No. 1,369,955 I disclosed an invention which involves the application to the tread of the wheels of tractors or similar machines, of a set of removable lugs, by the use of which I may roughen the surface of the tread of the wheel, or the wheels may be allowed to present a smooth surface as desired.

My present invention consists of certain novel and useful improvements on the construction shown in my former patent, and contemplates the use of a series of lugs similar in construction to those shown in said patent with individual supplemental lugs removably connected thereto, and by means of which the traction may be greatly increased when it is desired to operate the machine in soft ground, and which may be easily removed when transporting the machine from place to place along the road.

With the above and other objects in view, which will appear as the description proceeds, the invention consists in the novel features herein set forth, illustrated in the accompanying drawing and more particularly pointed out in the appended claims.

In describing my invention in detail, reference will be had to the accompanying drawing, wherein like characters of reference denote corresponding parts throughout the several views, and in which;

Fig. 1 is a view of the series of main lugs in place on the rim of the wheel, showing the slots which receive the individual supplemental lugs.

Fig. 2 is a similar view showing the supplemental lugs in place.

Fig. 3 is a detail perspective view of one of the supplemental lugs.

Fig. 4 is a view on line $x$—$x$ of Fig. 2, showing a cross section of a part of the main lug and the supplemental lug in place.

Fig. 5 is a plan view of the web and slot of the main lug.

In the drawings 1 designates the rim of a tractor or other wheel, to which is secured a series of detachable lugs 2. These lugs are applied to the rim of the wheel as at 12 by the means set forth in my co-pending application, filed of even date herewith and are provided with webs 3 in which there are cast slots 3ª to receive the individual supplemental lugs 4.

The supplemental lugs 4 are formed preferably from a single strip of metal bent upon itself and reinforced by the rivets 9. Below the point of bending, the lug diverges into side portions 5 and 6 which terminate in base portions 7, provided with upturned edges 7ª. To hold these lugs securely in place when on the wheel, the main lugs are provided with recesses 11 to receive the base portion 7 and upturned edges 7ª, and spuds 10 which engage the recesses 8 in the supplemental lugs.

To apply the supplemental lugs, the main lugs are removed and the supplemental lugs passed through the slot 3ª as shown in Fig. 2, so that the edges 7ª and the base portion 7 engage the recess 11, and the recesses 8 receive the spuds 10, the main lugs are then again placed in position on the wheel.

It is obvious that the lugs 4 may be formed from two separate pieces of metal riveted together as at 9, instead of from a single piece, as described.

What I claim and desire to secure by Letters Patent is:—

1. The combination with a vehicle wheel, of a series of interlocking lugs, each of said lugs being provided with slots extending therethrough, individual supplemental lugs engaging said slots, and means for securing said interlocking lugs to the rim of the wheel.

2. The combination with a vehicle wheel, of a series of interlocking lugs detachably connected to each other, each lug being provided with webs having slots and recesses cast therein, individual supplemental lugs detachably engaging said slots and recesses, and means for securing said interlocking lugs to the rim of the wheel.

3. The combination as claimed in claim 2, in which the supplemental lugs are formed substantially V-shaped, the ends terminating in bases, provided with recesses which engage projections on said interlocking lugs.

4. The combination as claimed in claim 2, in which the webs are provided on their under surfaces with recesses and spuds, said supplemental lugs being substantially V-shaped, reinforced at their top portions with rivets and terminating in bases which are provided with upturned edges adapted to engage the recesses in said webs in the main lugs, said spuds engaging recesses in the supplemental lugs.

In testimony whereof I affix my signature, in the presence of two witnesses.

JOHN A. BENTZ.

Witnesses:
SARAH I. MALONEY,
JOHN H. MALONEY, Jr.